M. MATTSON.
Vulcanizing Rubber Tubes.
No. 209,128. Patented Oct. 22, 1878.
Fig. 1.
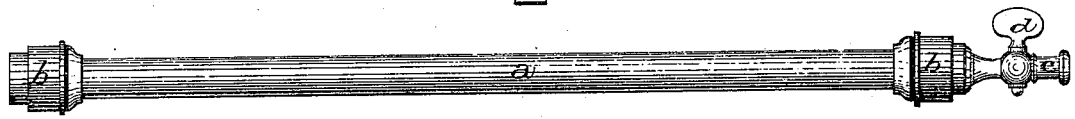
Fig. 2.
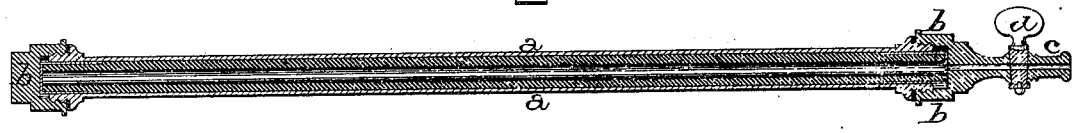
Fig. 3.
Witnesses:
J. W. Garner
H. S. D. Haines
Fig. 4.
Inventor
Morris Mattson,
per
J. A. Lehmann,
Atty

UNITED STATES PATENT OFFICE.

MORRIS MATTSON, OF NEW YORK, N. Y.

IMPROVEMENT IN VULCANIZING RUBBER TUBES.

Specification forming part of Letters Patent No. 209,128, dated October 22, 1878; application filed March 25, 1878.

*To all whom it may concern:*

Be it known that I, MORRIS MATTSON, of New York city, in the county of New York and State of New York, have invented certain new and useful Improvements in Method of Vulcanizing Rubber Tubes; and I do hereby declare the following to be a full, clear, and exact description of the invention, such as will enable others skilled in the art to which it pertains to make and use it, reference being had to the accompanying drawings, which form part of this specification.

My invention relates to a new process of making rubber tubing; and it consists in placing the rubber tube which is to be vulcanized, and which has been previously prepared by any suitable means or process, in a metallic or rigid tube from which the air has been exhausted, for the purpose of preventing air-cells from being formed in the surface of the tube, and then placing the tube thus sealed in an ordinary heater, where the rubber tube is vulcanized, as will be more fully described hereinafter.

The accompanying drawing represents a longitudinal vertical section of the tube or cylinder in which the rubber tube is vulcanized.

$a$ represents a metallic or other suitable rigid tube or cylinder, of any desired length, and which has an interior diameter of the exact size of the rubber tubing that is to be made. Each end of this tube or cylinder is closed by a suitable cap, cover, or plug, $b$, which should form an air-tight joint, and projecting from one of them is a tube, $c$, which is provided with a stop-cock, $d$. The end of the tube $c$ is connected by any suitable means with an air-pump or any other mechanical means for producing a vacuum, and after the air has been exhausted from the cylinder $a$ the stop-cock is turned, so as to prevent the return of the air after the cylinder is disconnected from the exhausting mechanism.

After the rubber tube has been formed in any suitable manner from the unvulcanized rubber without the presence of a wire it is inflated with air or the vapor of any suitable liquid to any desired extent, both ends closed with rubber caps, so as to retain the air, and it is then ready to be inserted into the cylinder $a$.

After the tube is inserted in the cylinder the caps or covers $b$ are placed in position and made air-tight by means of washers or in any other suitable manner, the stop-cock $d$ is opened, and the cylinder is connected with any suitable exhausting mechanism. After the air has been exhausted the stop-cock is closed, the cylinder disconnected from the exhausting mechanism, and then placed in the usual heater, where it is kept long enough to vulcanize the rubber tube within it.

As the air is exhausted from the cylinder between the surface of the tube and the inside of the cylinder, and as the tube is inflated with air, the surface of the tube through the expansion of the air is brought in close contact with every part of the smooth surface of the cylinder.

As the inside of the cylinder is smooth, so the rubber tube produced from it after vulcanization is beautifully smooth, even, and perfect.

Although but a single tube or cylinder, $a$, is here shown, it is evident that any number of them may be connected together so that all of them may be connected to the exhausting mechanism.

By the process above described a finer finish is given the tubing than it has when made by other methods. The tubing also may be made more rapidly and at a less cost.

Any name or device engraved upon a thin piece of metal and placed between the rubber tube and the cylinder during vulcanization will cause the device to be stamped upon the rubber tube.

I am aware that rubber tubing has heretofore been vulcanized while inflated with steam, and placed in a tube or mold, and this I disclaim.

I limit my invention to the exhaustion of the air from the mold in which the tube is vulcanized, so that no air is left in the mold to form air-cells in the sides of the rubber tubing, and thus destroy its fine finish.

Having thus described my invention, I claim—

1. The process herein described of vulcanizing rubber tubing, which consists in placing the tubing in a suitable pipe or mold, closing the ends of the mold with caps or covers, and then exhausting the air from the mold, so that no air-cells can be formed in the sides of the tubing, and then vulcanizing the tubing in a heater, substantially as set forth.

2. The tube or pipe $a$, provided with the caps $b$, nozzle $c$, for connection with an air-exhausting mechanism, and a cock, $d$, for preserving a vacuum, substantially as shown.

In testimony that I claim the foregoing I have hereunto set my hand and seal.

MORRIS MATTSON. [L. S.]

Witnesses:
F. H. HOLTON,
FRED DOTY.